(12) United States Patent
Wagoner et al.

(10) Patent No.: US 9,048,764 B2
(45) Date of Patent: Jun. 2, 2015

(54) CONNECTION FOR IMPROVED CURRENT BALANCING IN A PARALLEL BRIDGE POWER CONVERTER

(71) Applicant: General Electric Company, Schenectady, NY (US)

(72) Inventors: Robert Gregory Wagoner, Roanoke, VA (US); Anthony Michael Klodowski, Hardy, VA (US); David Smith, Daleville, VA (US); Steven Wade Sutherland, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 108 days.

(21) Appl. No.: 13/904,342

(22) Filed: May 29, 2013

(65) Prior Publication Data

US 2014/0354244 A1    Dec. 4, 2014

(51) Int. Cl.
| | |
|---|---|
| H02P 9/00 | (2006.01) |
| H02P 29/02 | (2006.01) |
| H02H 1/00 | (2006.01) |
| H02M 1/32 | (2007.01) |
| H02J 1/00 | (2006.01) |
| H02M 5/458 | (2006.01) |
| H02M 7/493 | (2007.01) |
| H02P 3/22 | (2006.01) |
| H02P 9/10 | (2006.01) |

(52) U.S. Cl.
CPC .............. *H02P 9/007* (2013.01); *H02P 29/021* (2013.01); *Y02E 10/725* (2013.01); *H02H 1/00* (2013.01); *H02M 1/32* (2013.01); *H02J 1/00* (2013.01); *H02M 5/4585* (2013.01); *H02M 7/493* (2013.01); *H02P 3/22* (2013.01); *H02P 9/10* (2013.01); *H02P 2009/004* (2013.01)

(58) Field of Classification Search
CPC ................................ H02J 7/1492; Y02T 10/92
USPC ............................................................ 322/91
See application file for complete search history.

(56) References Cited

U.S. PATENT DOCUMENTS

| | | | |
|---|---|---|---|
| 5,070,440 A | 12/1991 | Walker | |
| 5,450,309 A * | 9/1995 | Rohner | ............................ 363/71 |
| 6,545,450 B1 | 4/2003 | Ledenev et al. | |
| 6,751,105 B2 | 6/2004 | Yamanaka et al. | |
| 6,751,106 B2 | 6/2004 | Zhang et al. | |
| 6,856,040 B2 * | 2/2005 | Feddersen et al. | ............... 290/44 |
| 7,446,435 B2 | 11/2008 | Zhang et al. | |
| 7,643,318 B2 | 1/2010 | Wagoner | |
| 7,852,643 B2 * | 12/2010 | Zhang et al. | ..................... 363/65 |
| 7,876,191 B2 | 1/2011 | Chandrasekaran et al. | |

(Continued)

OTHER PUBLICATIONS

Related U.S. Appl. No. 13/744,948, filed Jan. 18, 2013.

(Continued)

*Primary Examiner* — Tulsidas C Patel
*Assistant Examiner* — Sean Gugger
(74) *Attorney, Agent, or Firm* — Dority & Manning, P.A.

(57) ABSTRACT

A power generation system may include a generator and a power converter coupled to the generator. The power converter may include a plurality of bridge circuits coupled in parallel. Each bridge circuit may be coupled to an inductor. In addition, the power converter may include a plurality of parallel shorting devices. The shorting devices may be coupled to the bridge circuits such that an impedance of the inductors is effectively coupled between the shorting devices and the generator.

20 Claims, 9 Drawing Sheets

(56) References Cited

U.S. PATENT DOCUMENTS

| | | | |
|---|---|---|---|
| 7,928,592 | B2 | 4/2011 | Wagoner et al. |
| 7,939,959 | B2 | 5/2011 | Wagoner et al. |
| 7,944,068 | B2 | 5/2011 | Wagoner et al. |
| 8,138,620 | B2 | 3/2012 | Wagoner et al. |
| 8,270,191 | B2 | 9/2012 | Zhu et al. |
| 8,310,074 | B2 | 11/2012 | Larsen et al. |
| 2004/0233690 | A1 | 11/2004 | Ledenev et al. |
| 2005/0281065 | A1* | 12/2005 | Nojima ............ 363/98 |
| 2006/0192390 | A1* | 8/2006 | Juanarena Saragueta et al. ............ 290/44 |
| 2007/0052244 | A1* | 3/2007 | Hudson ............ 290/44 |
| 2008/0054874 | A1 | 3/2008 | Chandrasekaran et al. |
| 2009/0008937 | A1* | 1/2009 | Erdman et al. ............ 290/44 |
| 2009/0322083 | A1* | 12/2009 | Wagoner et al. ............ 290/44 |
| 2010/0254168 | A1 | 10/2010 | Chandrasekaran |
| 2011/0299311 | A1 | 12/2011 | Zhu et al. |
| 2013/0027003 | A1* | 1/2013 | Zheng et al. ............ 322/99 |
| 2013/0056985 | A1* | 3/2013 | Lu et al. ............ 290/44 |
| 2013/0249501 | A1* | 9/2013 | Lu et al. ............ 322/21 |

OTHER PUBLICATIONS

Related U.S. Appl. No. 13/744,975, filed Jan. 18, 2013.
Related U.S. Appl. No. 13/744,991, filed Jan. 18, 2013.

* cited by examiner

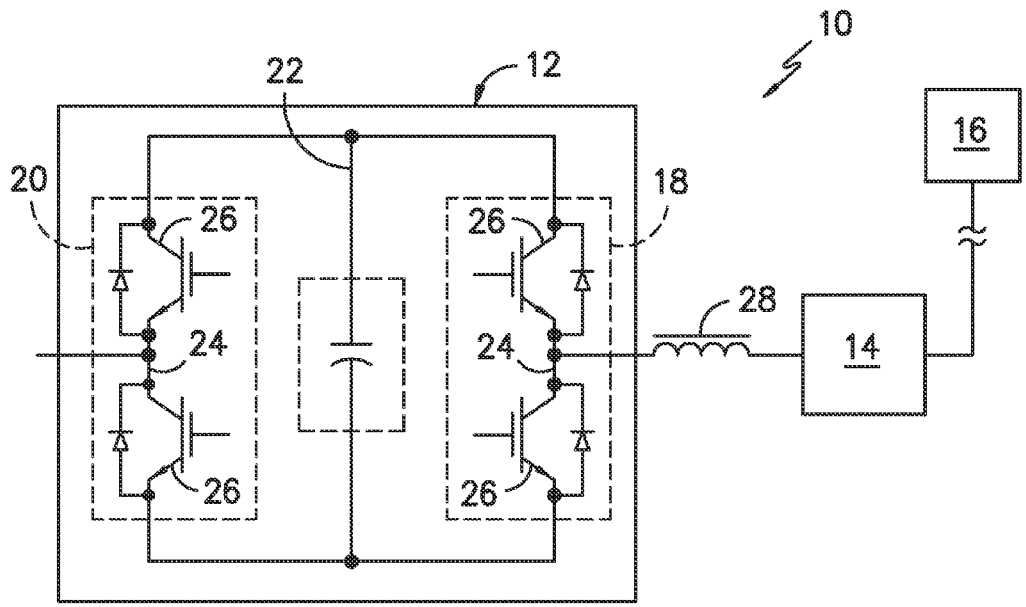
FIG. -1-
(PRIOR ART)
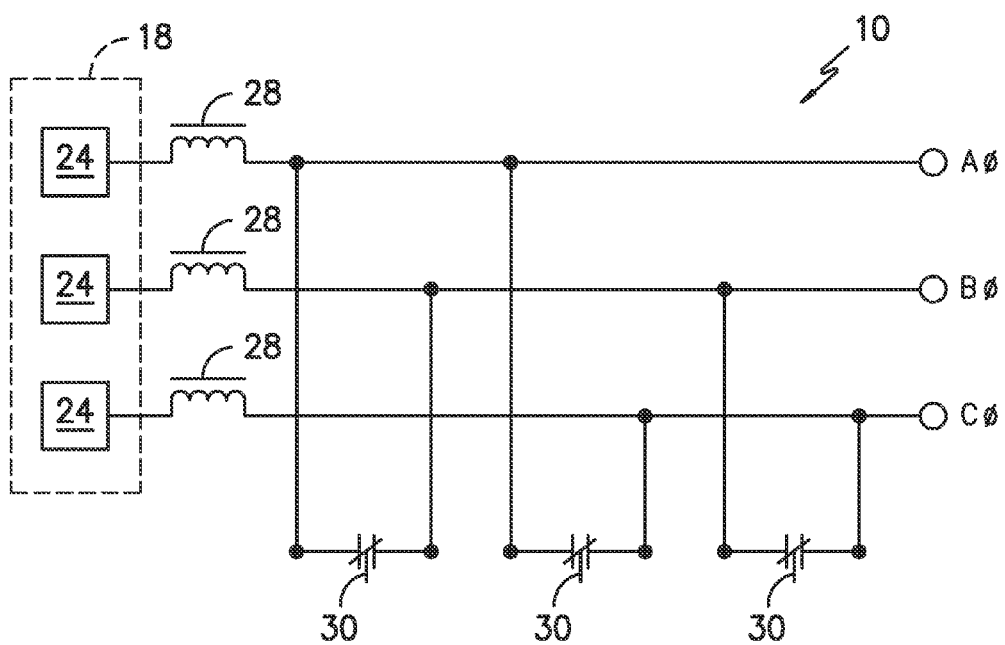
FIG. -2-
(PRIOR ART)

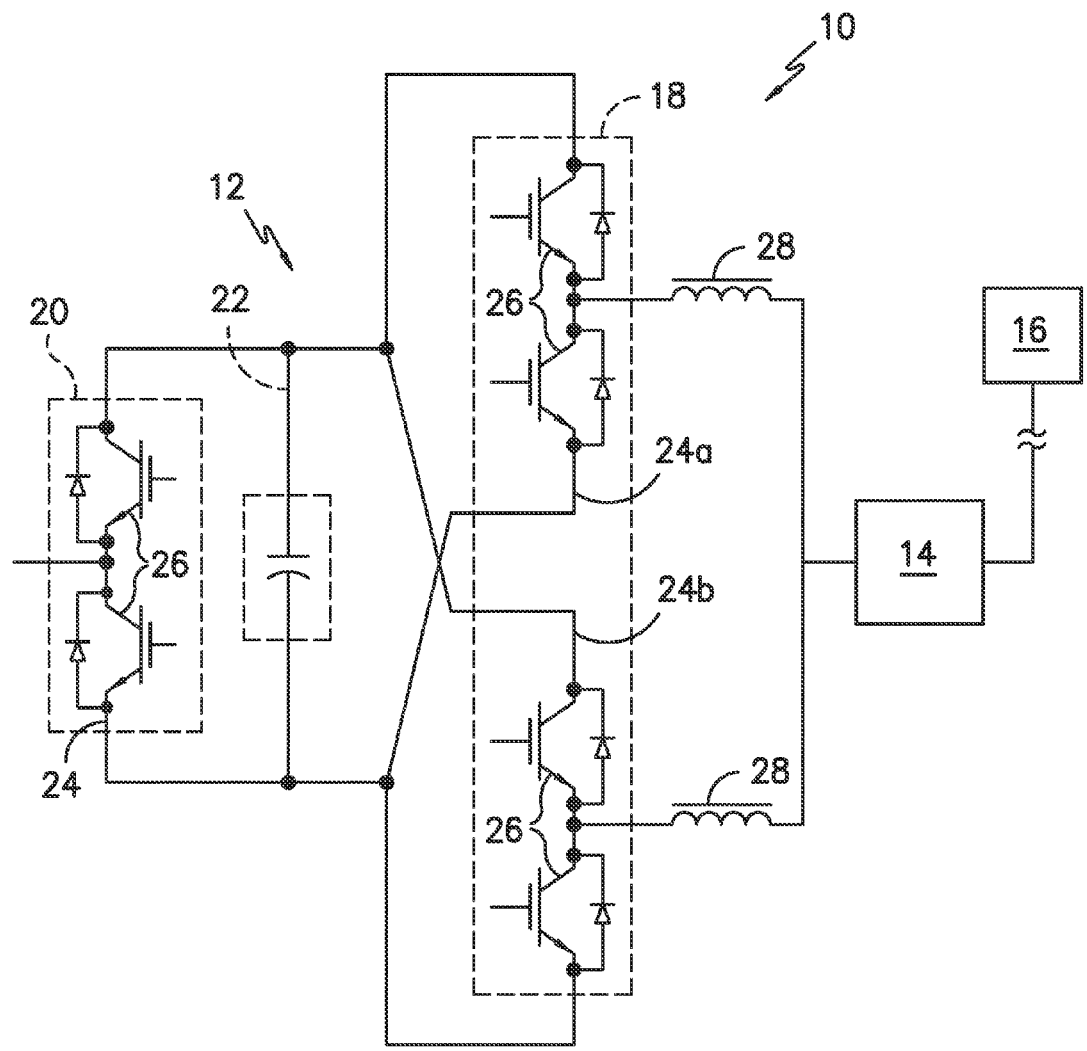
FIG. —3—
(PRIOR ART)

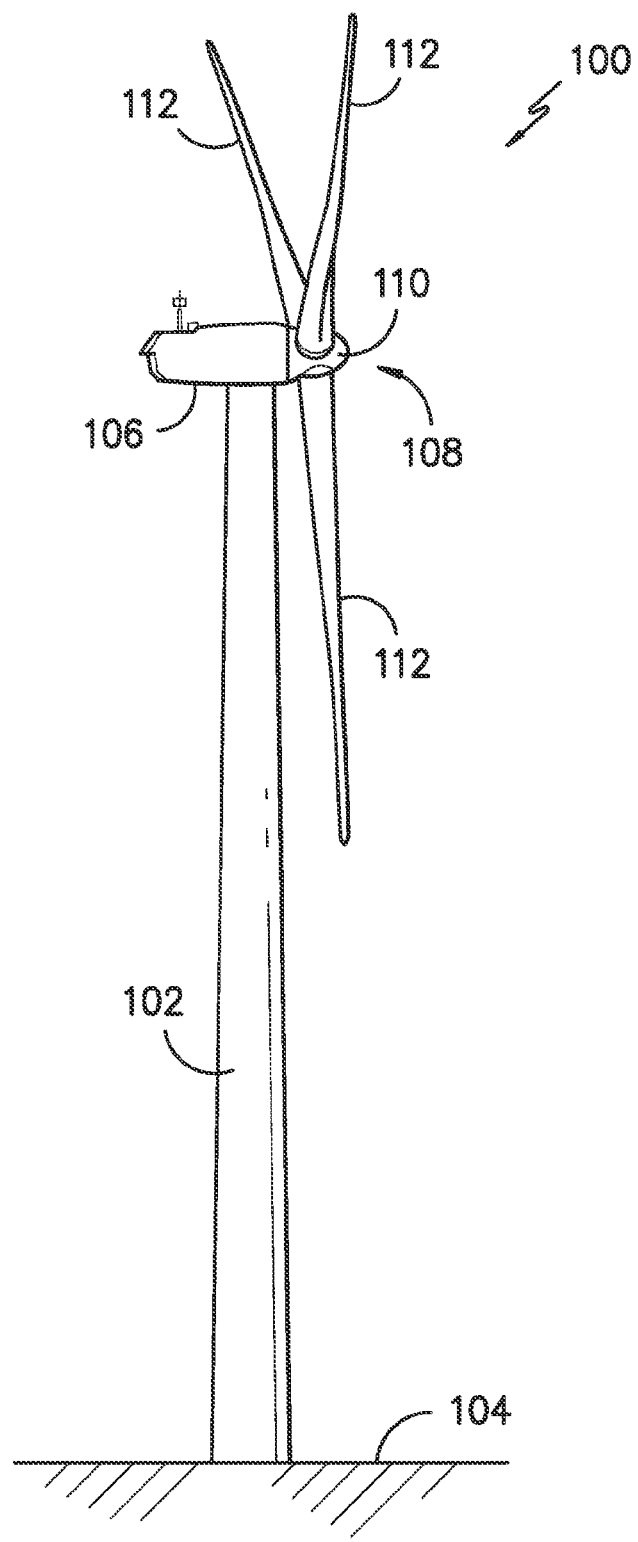
FIG. -4-

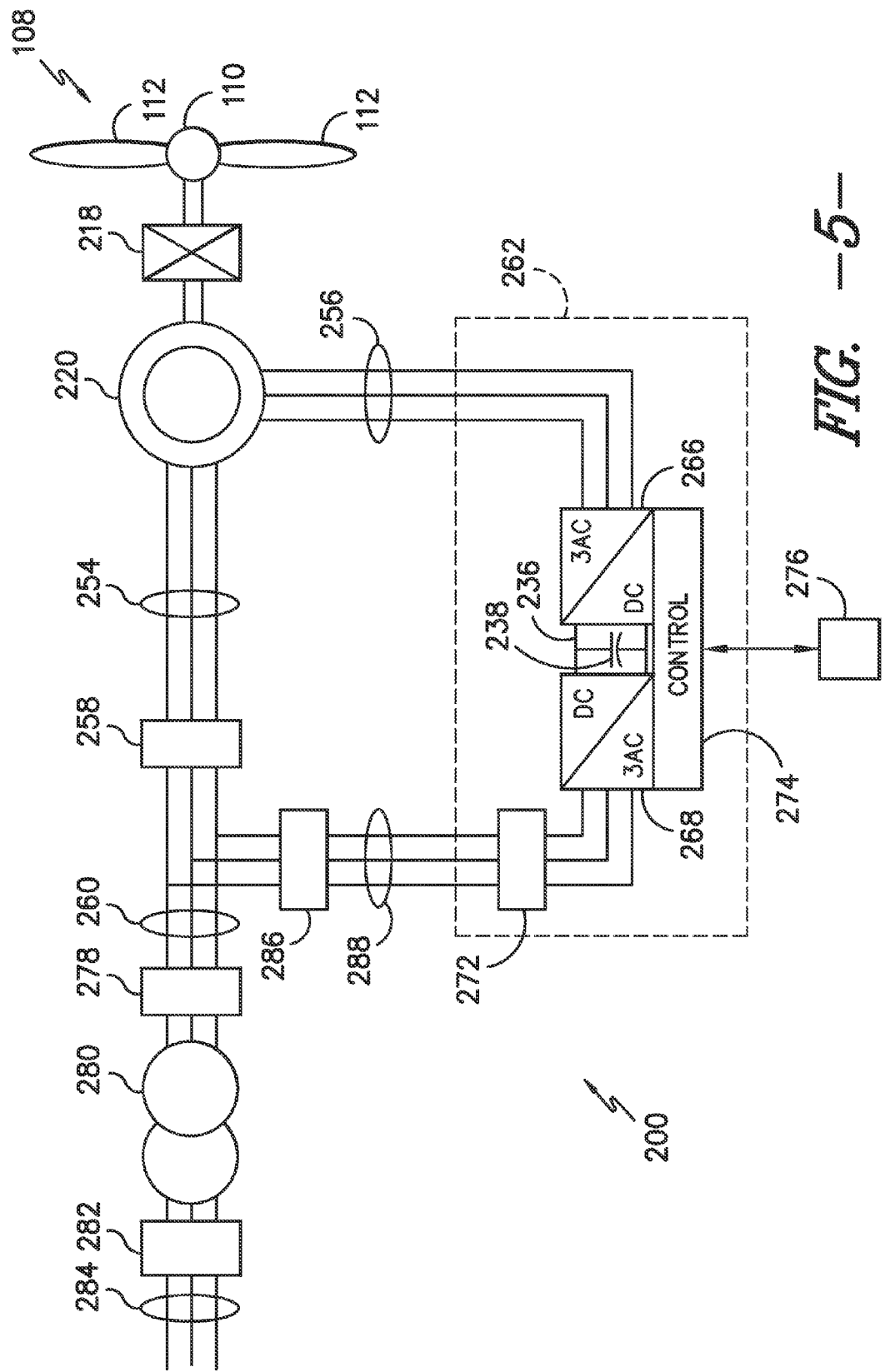
FIG. -5-

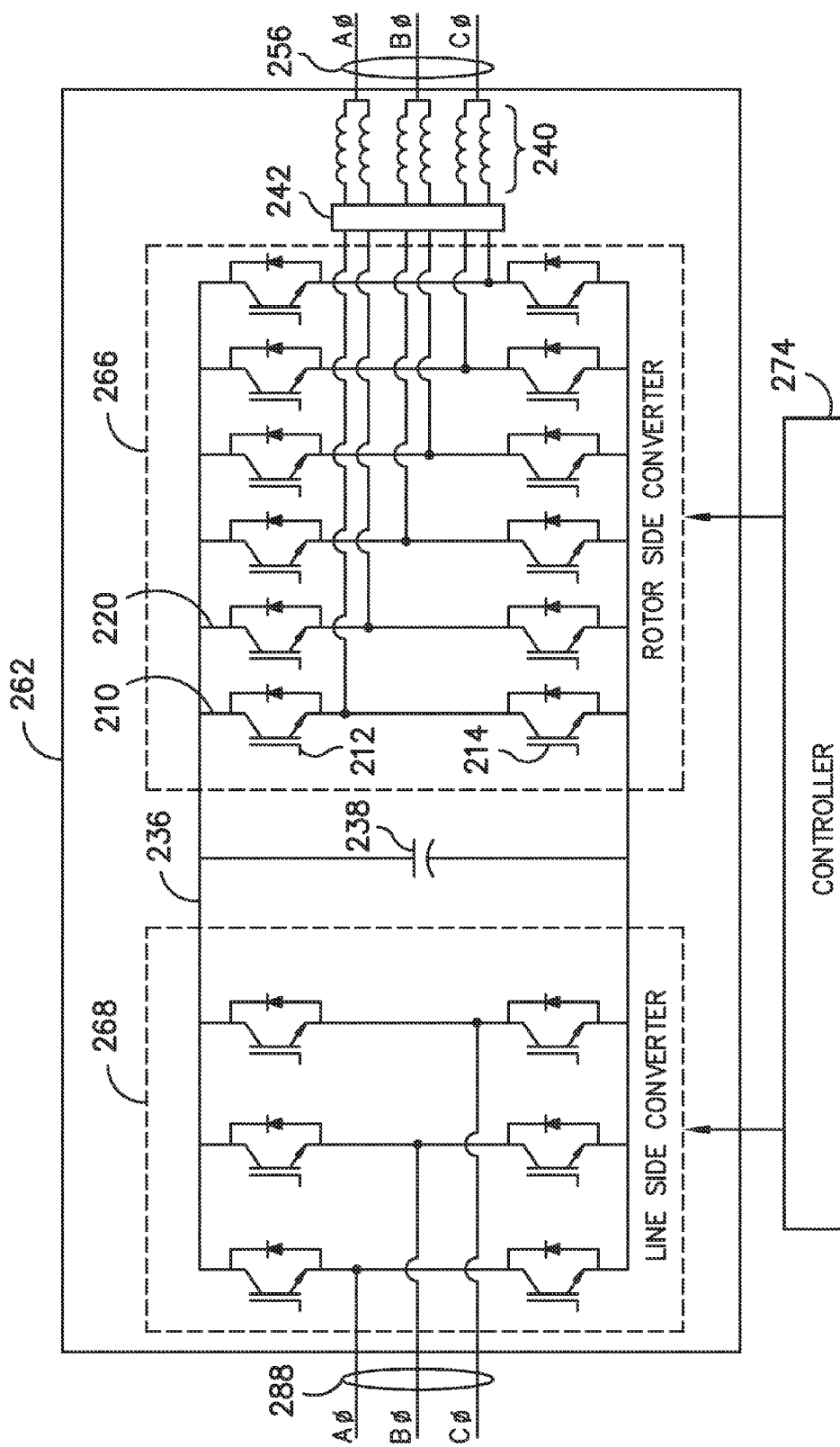
FIG. -6-

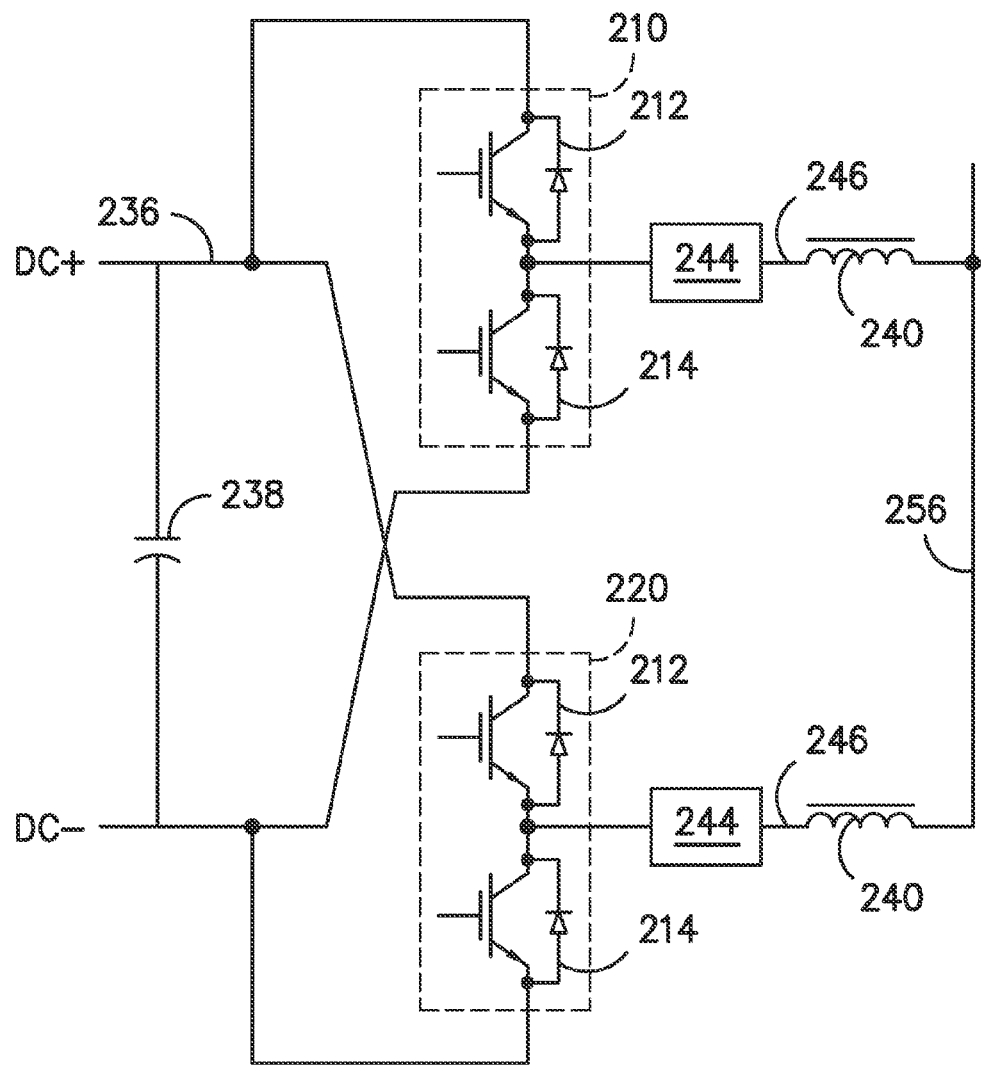
FIG. -7-

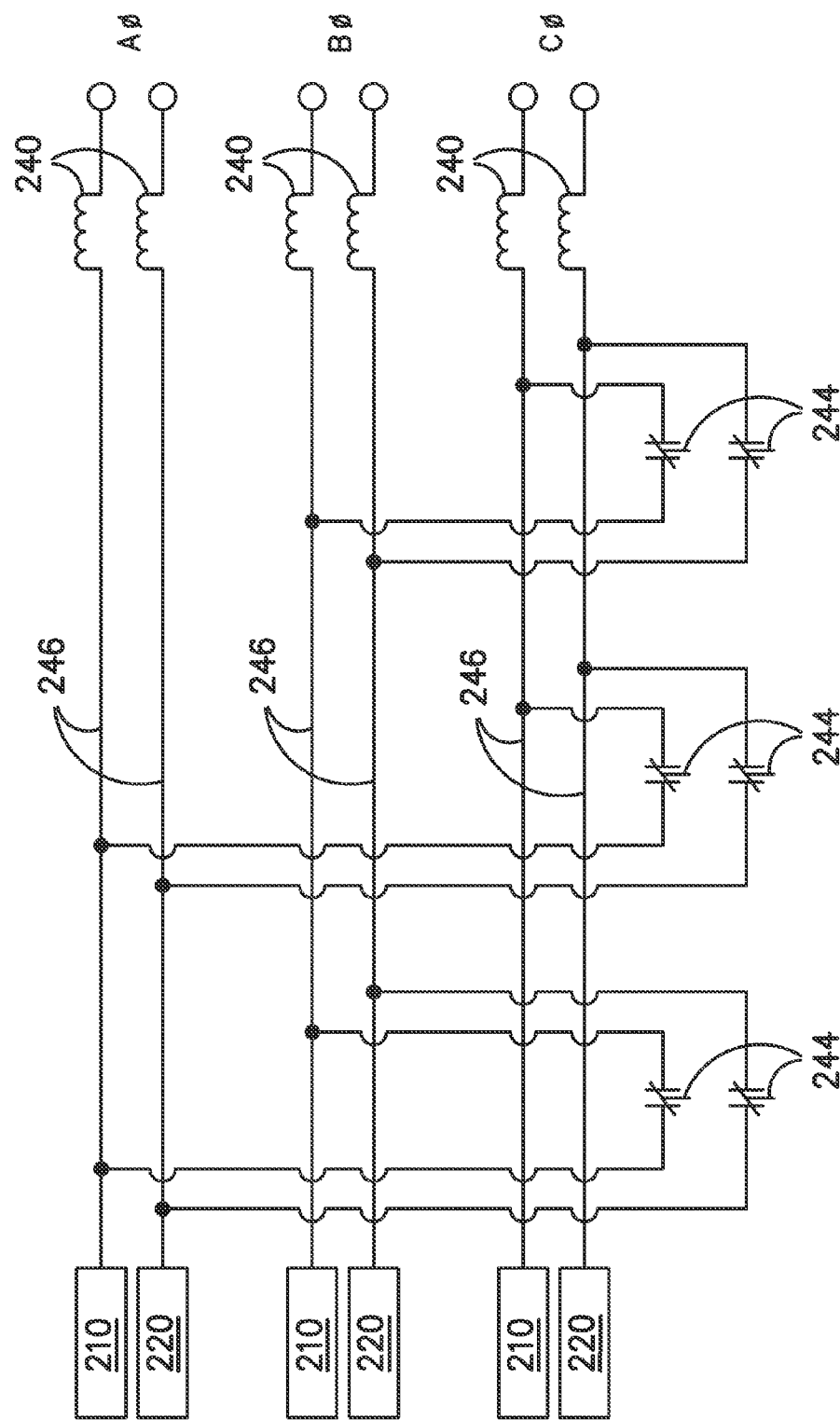
FIG. —8—

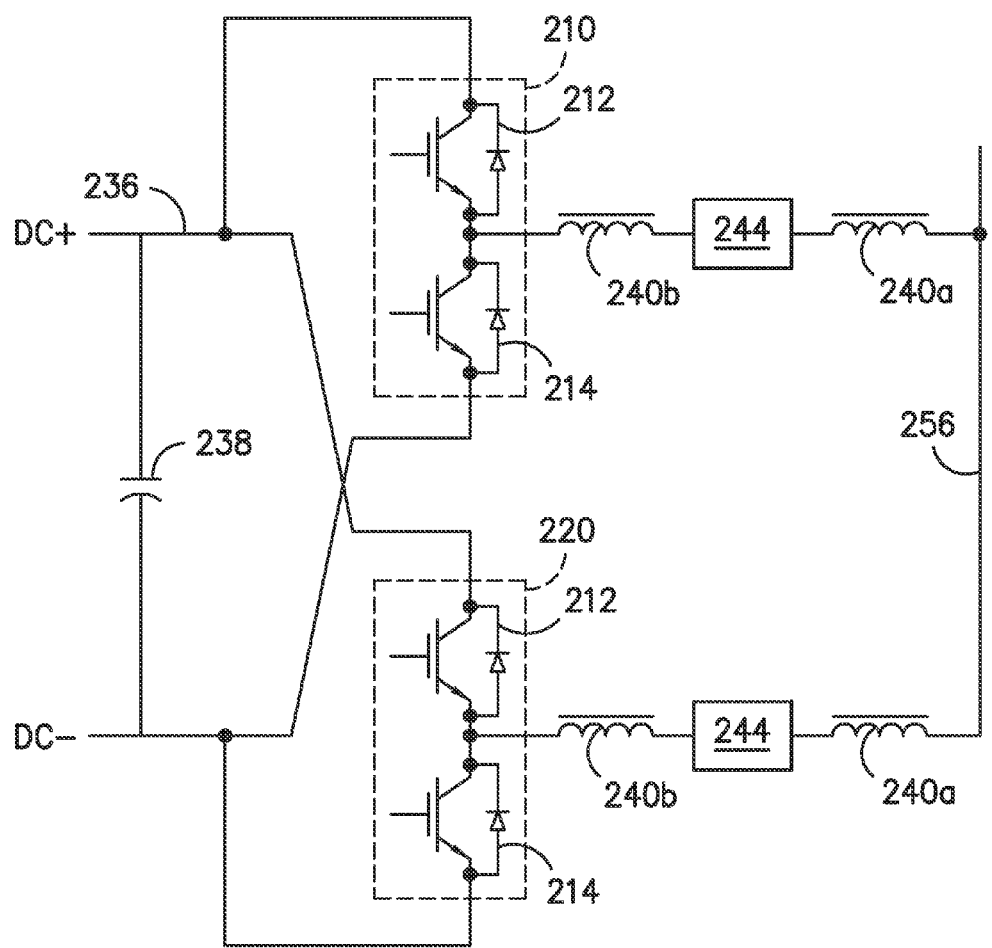
FIG. -9-

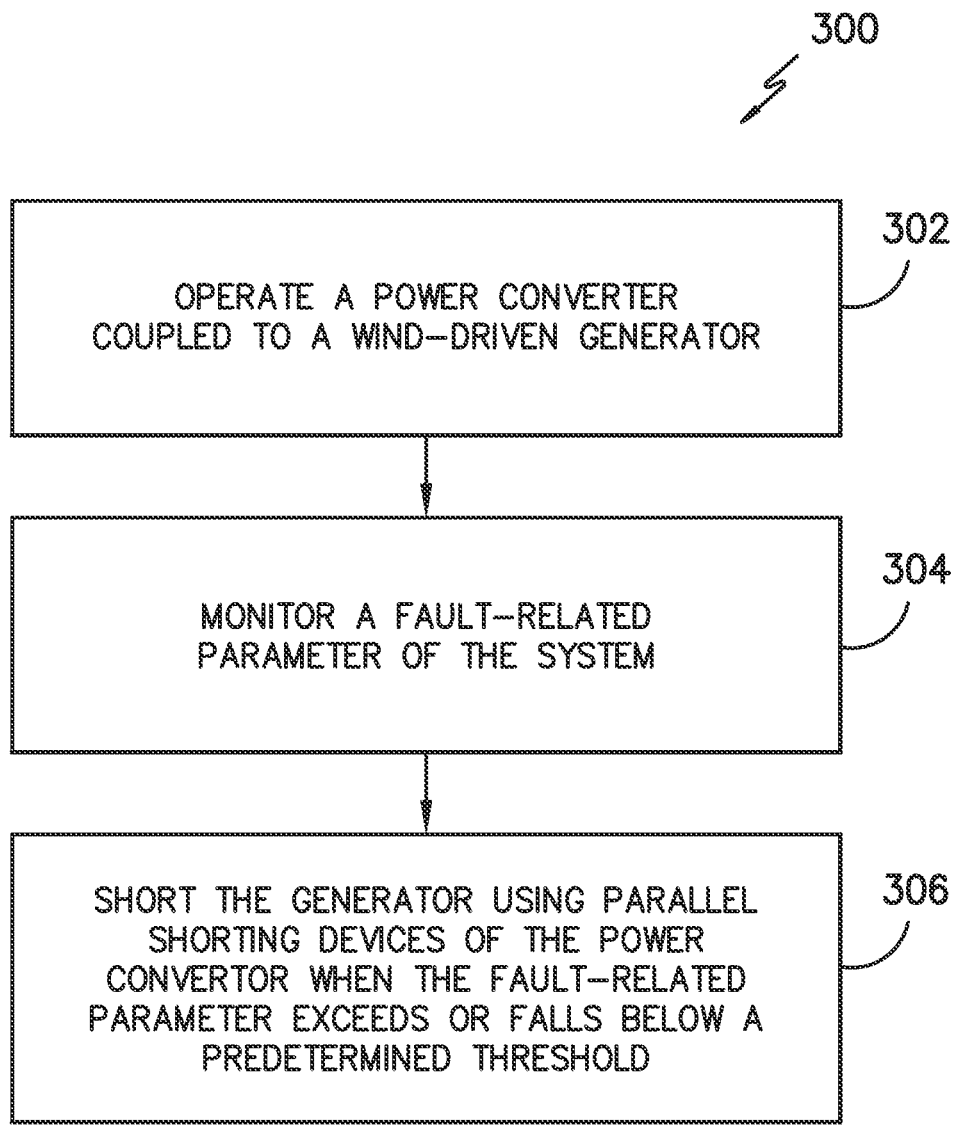
FIG. -10-

US 9,048,764 B2

CONNECTION FOR IMPROVED CURRENT BALANCING IN A PARALLEL BRIDGE POWER CONVERTER

FIELD OF THE INVENTION

The present subject matter relates generally to power converters and, more particularly, to a connection for improved current balancing in parallel contactors for a parallel bridge power converter, such as a non-interleaved DFIG power converter.

BACKGROUND OF THE INVENTION

Power generation systems often include a power converter that is configured to convert an input power into a suitable power for application to a load, such as a generator, motor, electrical grid, or other suitable load. For instance, a power generation system, such as a wind turbine system, may include a power converter for converting variable frequency alternating current power generated at the generator into alternating current power at a grid frequency (e.g. 50 Hz or 60 Hz) for application to a utility grid. An exemplary power generation system may generate AC power using a wind-driven doubly fed induction generator (DFIG). A power converter can regulate the flow of electrical power between the DFIG and the grid.

Under certain conditions (e.g., transient power conditions), a high power mismatch between the rotor and the grid connection temporally exists and voltage transients become amplified such that a DC link voltage level can increase above normal allowed or rated levels. To absorb or deflect power during such excessive power level conditions, known systems utilize a fast acting shorting means, such as a crowbar circuit, between the rotor terminals of the DFIG and the rotor converter. In operation, these shorting devices provide a short circuit at the rotor terminals to prevent excess power from flowing to the rotor converter.

For example, FIGS. 1 and 2 illustrate schematic diagrams of a conventional DFIG system 10 including a power converter 12 and a crowbar circuit 14. Specifically, FIG. 1 illustrates a single phase of the power converter 12 and FIG. 2 illustrates the three-phase connection of the crowbar circuit 14. As shown, the power converter 12 is coupled to a rotor 16 of the DFIG (not shown). The power converter 12 is a two-stage converter including both a rotor side converter 18 and a line side converter 20 coupled together by a DC link 22. Each converter 18, 20 includes a bridge circuit 24 for each phase, with each bridge circuit 24 including a plurality of switching elements (e.g., a pair of IGBTs 26 coupled in series). The power converter 12 may also include an inductive element 28 coupled in series with the bridge line of each bridge circuit 24 of the rotor side converter 18.

As particularly shown in FIG. 2, the crowbar circuit 14 is implemented using crowbar contactors 30 connected across the rotor 16 of the DFIG. Specifically, the contactors 30 are connected line-to-line such that the inductive elements 28 are coupled between the contactors 30 and the bridge circuits 24 of the rotor side converter 18. As is generally understood, the contactors 30 are configured to be normally closed so that the rotor 16 is shorted until it is verified normal power levels exist within the system 10. Upon verification of normal power levels, the contactors 30 are opened to allow power to flow to the rotor side converter 18.

As the power levels of DFIG systems have been increased over time, it has become necessary to connect the bridge circuits of the rotor side converter in parallel. For example, FIG. 3 illustrates the DFIG system 10 shown in FIG. 1 with the rotor side converter 18 being configured as a parallel bridge converter. As shown in FIG. 3, the rotor side converter 18 includes a first bridge circuit 24a and a second bridge circuit 24b coupled in parallel for each phase, with each bridge circuit 24a, 24b including a plurality of switching elements (e.g., a pair of IGBTs 26 coupled in series). Additionally, each bridge circuit 24a, 24b has a bridge line coupled to the crowbar circuit 14 via an inductive element 28. Similar to that described above with reference to FIGS. 1 and 2, the crowbar circuit 14 is typically implemented with crowbar contactors coupled line-to-line between the inductive elements 28 and the rotor 16 of the DFIG.

In addition to connecting the bridge circuits of the rotor side converter in parallel, the increase in the power levels of DFIG systems has also made it necessary to utilize larger shorting contactors that are rated to operate at higher currents. As a result, the overall cost of power converters has been increased. Moreover, it is often the case that shorting contactors large enough to handle the increased currents are unavailable.

Accordingly, it is desirable to provide a power generation system, such as a DFIG system, that includes contactors connected in parallel, thereby alleviating the need for larger, more expensive contactors. Furthermore, since parallel contactors may lead to current imbalances, it is desirable for the power converter to include a suitable means for balancing the current within the parallel contactors.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a power generation system. The power generation system may include a generator and a power converter coupled to the generator. The power converter may include a plurality of bridge circuits coupled in parallel. Each bridge circuit may be coupled to an inductor. In addition, the power converter may include a plurality of parallel shorting devices. The shorting devices may be coupled to the bridge circuits such that an impedance of the inductors is effectively coupled between the shorting devices and the generator.

In another aspect, the present subject matter is directed to a power generation system. The power generation system may include a doubly fed induction generator and a power converter coupled to the doubly fed induction generator. The power converter may include a rotor side converter and a line side converter. The rotor side converter may include a plurality of bridge circuits coupled in parallel. Each bridge circuit may be coupled to an inductor. In addition, the rotor side converter may include a plurality of parallel shorting devices. The shorting devices may be coupled to the bridge circuits such that an impedance of the inductors is effectively coupled between the shorting devices and the rotor of the doubly fed induction generator.

In a further aspect, the present subject matter is directed to a method for assembling a power generation system. In general, the method may include coupling a power converter to a generator. The power converter may include a plurality of bridge circuits coupled in parallel and a plurality of parallel shorting devices coupled to the bridge circuits. Each bridge circuit may also be coupled to a rotor inductor. In addition, the method may include effectively coupling an impedance of the rotors inductors between the shorting devices and the generator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic diagram of a conventional DFIG system including a power converter and a crowbar circuit;

FIG. 2 illustrates a schematic diagram of the three-phase connection of the crowbar circuit shown in FIG. 1;

FIG. 3 illustrates a variation of the conventional DFIG system shown in FIG. 1, particularly illustrating the power converter including a rotor side converter with parallel bridge circuits;

FIG. 4 illustrates a perspective view of one embodiment of a wind turbine;

FIG. 5 illustrates a schematic diagram of one embodiment of a DFIG wind turbine system in accordance with aspects of the present subject matter;

FIG. 6 illustrates a schematic diagram of one embodiment of a power converter suitable for use with the DFIG wind turbine system shown in FIG. 5;

FIG. 7 illustrates a schematic diagram of the paralleled bridge circuits used in the rotor side converter of the power converter shown in FIG. 6, particularly illustrating the shorting devices of a crowbar circuit being coupled between each bridge circuit and its corresponding rotor inductor;

FIG. 8 illustrates a detailed schematic diagram of the three-phase connection of the shorting devices shown in FIG. 7;

FIG. 9 illustrates a schematic diagram of another embodiment of the rotor side converter shown in FIG. 7, particularly illustrating the shorting devices coupled between separate rotor inductors; and FIG. 10 illustrates a flow diagram of one embodiment of a method for operating a power generation system.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for operating a power generation system, such as a doubly fed induction generator (DFIG) wind turbine system. In particular, the present subject matter is directed to a connection for improved current balancing in parallel shorting devices of a parallel bridge DFIG power converter. Specifically, in several embodiments, the rotor side converter of the power converter may include a plurality of bridge circuits coupled in parallel, with each parallel bridge circuit being coupled to a rotor inductor. In addition, a plurality of parallel shorting devices (e.g., crowbar contactors) may be coupled between the bridge circuits and the rotor inductors such that the impedance of the inductors is effectively coupled between the shorting devices and the rotor of the DFIG. As a result, the impedance of the rotor inductors may be used to balance the current in the shorting devices.

It should be appreciated that numerous advantages may be provided by configuring a power converter as described herein. Specifically, by using parallel shorting devices, the increased power levels associated with parallel bridge DFIG power converters may be accommodated without the need to use very large and expensive shorting devices. In addition, the improved current balancing achieved via coupling the parallel shorting devices between the bridge circuits and their corresponding rotor inductors may generally enhance operation of the power convertor by allowing the shorting devices to operate closer to their rating. As a result, this will provide a more reliable converter system, with more output current capability and improved coordination with upstream protection.

Referring now to the drawings, FIG. 4 illustrates a perspective view of one embodiment of a wind turbine 100. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 10. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, as will be described below, the rotor 108 may be rotatably coupled to an electric generator 220 (FIG. 5) to permit electrical energy to be produced.

Referring now to FIG. 5, a schematic diagram of one embodiment of a DFIG wind turbine system 200 is illustrated in accordance with aspects of the present subject matter. It should be appreciated that the present subject matter will generally be described herein with reference to the system 200 shown in FIG. 5. However, those of ordinary skill in the art, using the disclosures provided herein, should understand that aspects of the present disclosure may also be applicable in other power generation systems.

As shown, the rotor 108 of the wind turbine 100 (FIG. 4) may, optionally, be coupled to a gear box 218, which is, in turn, coupled to a generator 220. In accordance with aspects of the present disclosure, the generator 220 is a doubly fed induction generator (DFIG).

As shown, the DFIG 220 may be coupled to a stator bus 254 and a power converter 262 via a rotor bus 256. The stator bus 254 may provide an output multiphase power (e.g. three-phase power) from a stator of the DFIG 220 and the rotor bus 256 may provide an output multiphase power (e.g. three-phase power) from a rotor of the DFIG 120. As shown in FIG. 5, the power converter 262 includes a rotor side converter 266 and a line side converter 268. The DFIG 220 may be coupled via the rotor bus 256 to the rotor side converter 266. Additionally, the rotor side converter 266 may be coupled to the line side converter 268 which may, in turn, be coupled to a line side bus 288.

In several embodiments, the rotor side converter 266 and the line side converter 128 may be configured for normal operating mode in a three-phase, pulse width modulation (PWM) arrangement using insulated gate bipolar transistor (IGBT) switching elements as will be discussed in more detail with respect to FIG. 6. The rotor side converter 126 and the line side converter 268 may be coupled via a DC link 126 across which is a DC link capacitor 238.

In addition, the power converter 262 may be coupled to a controller 274 in order to control the operation of the rotor side converter 266 and the line side converter 268. It should be noted that the controller 124 may, in several embodiments, be configured as an interface between the power converter 262 and a control system 276. The controller 274 may include any number of control devices. In one embodiment, the controller 274 may include a processing device (e.g. microprocessor, microcontroller, etc.) executing computer-readable instructions stored in a computer-readable medium. The instructions when executed by the processing device may cause the processing device to perform operations, including providing control commands to the switching elements and/or the shorting devices of the power converter 262.

In typical configurations, various line contactors and circuit breakers including, for example, a grid breaker 282 may also be included for isolating the various components as necessary for normal operation of the DFIG 220 during connection to and disconnection from the electrical grid 284. For example, a system circuit breaker 278 may couple the system bus 260 to a transformer 280, which may be coupled to the electrical grid 284 via the grid breaker 282. In alternative embodiments, fuses may replace some or all of the circuit breakers.

In operation, alternating current power generated at the DFIG 220 by rotating the rotor 108 is provided via a dual path to the electrical grid 284. The dual paths are defined by the stator bus 254 and the rotor bus 256. On the rotor bus side 256, sinusoidal multi-phase (e.g. three-phase) alternating current (AC) power is provided to the power converter 262. The rotor side power converter 266 converts the AC power provided from the rotor bus 256 into direct current (DC) power and provides the DC power to the DC link 236. As is generally understood, switching elements (e.g. IGBTs) used in the bridge circuits of the rotor side power converter 266 may be modulated to convert the AC power provided from the rotor bus 256 into DC power suitable for the DC link 236.

In addition, the line side converter 268 converts the DC power on the DC link 126 into AC output power suitable for the electrical grid 124. In particular, switching elements (e.g. IGBTs) used in bridge circuits of the line side power converter 268 can be modulated to convert the DC power on the DC link 236 into AC power on the line side bus 288. The AC power from the power converter 262 can be combined with the power from the stator of DFIG 220 to provide multi-phase power (e.g. three-phase power) having a frequency maintained substantially at the frequency of the electrical grid 284 (e.g. 50 Hz or 60 Hz).

Additionally, various circuit breakers and switches, such as grid breaker 282, system breaker 278, stator sync switch 258, converter breaker 286, and line contactor 272 may be included in the system 200 to connect or disconnect corresponding buses, for example, when current flow is excessive and may damage components of the wind turbine system 100 or for other operational considerations. Additional protection components may also be included in the wind turbine system 200, such as the crowbar circuit described below.

Moreover, the power converter 262 may receive control signals from, for instance, the control system 276 via the controller 274. The control signals may be based, among other things, on sensed conditions or operating characteristics of the wind turbine system 200. Typically, the control signals provide for control of the operation of the power converter 262. For example, feedback in the form of a sensed speed of the DFIG 220 may be used to control the conversion of the output power from the rotor bus 256 to maintain a proper and balanced multi-phase (e.g. three-phase) power supply. Other feedback from other sensors may also be used by the controller 274 to control the power converter 262, including, for example, stator and rotor bus voltages and current feedbacks. Using the various forms of feedback information, switching control signals (e.g. gate timing commands for IGBTs), shorting control signals, stator synchronizing control signals, and circuit breaker signals may be generated.

Referring now to FIG. 6, a schematic diagram of one embodiment of the power converter 262 shown in FIG. 5 is illustrated in accordance with aspects of the present subject matter. As shown, the rotor side converter 266 includes a plurality of bridge circuits (e.g. H-bridge circuits) coupled in parallel. More particularly, each phase of the rotor bus 256 input to the rotor side converter 266 is coupled to two bridge circuits. For instance, the A input to the rotor side converter 266 is coupled to bridge circuits 210 and 220 coupled in parallel. Using parallel bridge circuits can increase the output capability of the power converter 262.

The line side converter 268 can also include a plurality of bridge circuits. In particular, the line side converter 268 includes a single bridge circuit for each output phase of the line converter 268. In FIG. 6, only the rotor side converter 266 is illustrated as having parallel bridge circuits. Those of ordinary skill in the art, using the disclosures provided herein, should appreciate that both the line side converter 268 and the rotor side converter 266 may include parallel bridge circuits without deviating from the scope of the present disclosure.

Each bridge circuit includes a plurality of switching elements (e.g. IGBTs) coupled in series with one another. For instance, each bridge circuit includes an upper IGBT (e.g. IGBT 212) and a lower IGBT (e.g. IGBT 214). A diode is coupled in parallel with each of the IGBTs. The line side converter 268 and the rotor side converter 266 are controlled, for instance, by providing control commands, using a suitable driver circuit, to the gates of the IGBTs. For example, the controller 274 can provide suitable gate timing commands to the gates of the IGBTs of the bridge circuits. The control commands can control the pulse width modulation of the IGBTs to provide a desired output. In one embodiment, the parallel bridge circuits, such as parallel bridge circuits 210 and 220, may be controlled according to a substantially non-interleaved switching pattern such that the switching elements of the parallel bridge circuits are switched in phase with one another. For instance, the upper IGBTs of the parallel bridge circuits can be switched in phase with one another and the lower IGBTs of the parallel bridge circuits can be switched in phase with another. In other embodiments, the parallel bridge circuits may be controlled according to any other suitable switching pattern. It will be appreciated by those of ordinary skill in the art that other suitable switching elements can be used in place of IGBTs.

Additionally, as shown in FIG. 6, a plurality of rotor inductors 240 may be coupled in series with bridge outputs of each of the plurality of bridge circuits of the rotor side converter 266. In particular, the rotor inductors 240 may be coupled in series with the bridge outputs of the bridge circuits before the bridge outputs are paralleled together to provide the parallel bridge circuits. As a result, the rotor inductors 240 are effectively coupled between the parallel bridge circuits. The rotor inductors 240 may generally be any suitable inductive elements, such as elements that include coils of conductor and/or iron cores. For example, the rotor inductors 240 may be as simple as lengths of wire, which naturally include inductance and resistance.

Moreover, as shown in FIG. 7, the power converter 262 may also include a crowbar circuit 242 configured to provide a short circuit to prevent excess power from flowing to the rotor side converter 266. As will be described below, the crowbar circuit 242 may be implemented using a plurality of parallel shorting devices 244 (FIGS. 6 and 7) coupled between the rotor inductors 240 and the bridge circuits of the rotor side convertor 266, which may allow the impedance of the rotor inductors 240 to be used to balance the current in the shorting devices 244.

Referring now to FIG. 7, a schematic diagram of exemplary paralleled bridge circuits 210 and 220 used in the rotor side converter 266 is illustrated in accordance with aspects of the present subject matter. The parallel bridge circuits are associated with a single phase of the rotor side converter 266, such as the A of the rotor side converter 266. As shown, a first bridge circuit 210 including an upper IGBT 212 and a lower IGBT 214 is coupled in parallel with a second bridge circuit 220 including an upper IGBT 212 and a lower IGBT 224. As is generally understood, the bridge circuits 210, 220 may be coupled to one or more driver circuits configured to provide gate driving signals to the IGBTs. Additionally, the first bridge circuit 210 and the second bridge circuit 220 may each have a bridge line 246 coupled to the rotor bus 256 through respective rotor inductors 240.

Moreover, as shown in FIG. 7, parallel shorting devices 244 may be coupled between the bridge circuits 210, 220 and the rotor inductors 240. In general, the shorting devices 244 may be configured to be normally closed as a safety measure to prevent the flow of excessive power to the bridge circuits 210, 220. Feedback associated with the power levels within the system 200 may be continuously transmitted to the controller 274. Once it is confirmed that conditions within the system 200 are suitable, the controller 274 may then transmit control signals to open the shorting devices 244 and, thus, allow power to be transmitted to the bridge circuits 210, 220.

FIG. 8 illustrates a detailed schematic diagram of the three-phase connection for the parallel shorting devices 244. As shown, each shorting device 244 is electrically coupled to the bridge lines 246 of the bridge circuits 210, 220 across two phases of the input to rotor side converter 266 such that the rotor inductors 240 are located between the shorting devices 244 and the rotor of the DFIG 220. In other words, the shorting devices 244 are coupled to the bridge circuits 210, 220 such that the impedance of the inductors 240 is effectively coupled between the shorting devices 244 and the DFIG. 220. As such, the impedance of the rotor inductors 240 may be utilized to balance the current in the parallel shorting devices 244. Specifically, the impedance may provide a voltage drop at high currents that is significantly higher than the voltage drop due to the resistances of the shorting devices 244, thereby effectively overwhelming the total impedance that causes the current to share between the parallel shorting devices 244. This results in the current flowing in each of the shorting devices 244 to be substantially determined by the impedance of the inductors 240. Thus, by selecting inductors designed with tight manufacturing tolerances that have the same or substantially the same impedance (both real and reactive), the current in the shorting devices 244 may be effectively balanced. It should be appreciated that, as used herein, inductors have substantially the same impedance if their impedances are within 10% of one another, such as within 5% of one another or within 2.5% of one another and any other subranges therebetween.

It should be appreciated that the disclosed crowbar circuit 242 may be implemented using any suitable shorting devices known in the art. For example, in several embodiments, the shorting devices 244 may be shorting or crowbar contactors. In other embodiments, the shorting devices may be any other suitable devices/elements capable of providing the functionality described herein, such as IGBTs, transistors, thyristors, and/or the like.

It should also be appreciated that present subject matter need not be limited to any particular configuration of the electrical connection for the shorting devices 244. For example, in the illustrated embodiment, the connection is shown as a line-to-line (delta) connection. However, in other embodiments, the connection may be a line-to-midpoint (wye) connection.

Referring now to FIG. 9, a variation of the rotor side converter 266 shown in FIG. 7 is illustrated in accordance with aspects of the present subject matter. As shown, in several embodiments, each bridge circuit 210, 220 may be coupled in series to two rotor inductors 240a, 240b, with the shorting devices 244 being coupled between the inductors 240a, 240b. Specifically, a first inductor 240a may be coupled between the DFIG 220 and the shorting devices 244 and a second inductor 240b may be coupled between the shorting devices 244 and each bridge circuit 210, 220, thereby providing some impedance along both sides of the shorting devices 244. As an alternative to including two separate inductors, a tapped inductor may be coupled in series with each bridge circuit 210, 220, with the tap being coupled to the shorting devices 244.

Referring now to FIG. 10, a flow diagram of one embodiment of a method 300 for operating a power generation system is illustrated in accordance with aspects of the present subject matter. In general, the method 300 will be described herein as being implemented using a wind turbine system, such as the DFIG wind turbine system 200 described above with reference to FIG. 5. However, it should be appreciated that the disclosed method 300 may be implemented using any other suitable power generation system that is configured to supply power for application to a load. In addition, although FIG. 10 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

At (302), the method 200 includes operating a power converter coupled to a wind-driven generator. In several embodiments, the power converter may be a two-stage power converter that includes a rotor side converter and a line side converter coupled together by a DC link. The rotor side converter may include a plurality of bridge circuits coupled in parallel. Each bridge circuit may be coupled in series to a rotor inductor. In addition, the rotor side converter may include a crowbar circuit. As indicated above, the crowbar circuit may be implemented using a plurality of parallel shorting devices coupled to the bridge circuits such that the impedance of the inductors is effectively coupled between the shorting devices and the wind-driven generator, such as that shown in FIGS. 7-9.

At (304), a fault-related parameter of the system is monitored. In general, the fault-related parameter may be any suitable parameter that provides an indication of a transient power condition or any other fault-related condition of the system. For example, a controller of the system (e.g., controller 274) may be coupled to suitable sensors that allow the controller to monitor the system's current, voltage and/or any other suitable fault-related parameter.

At (306), the rotor of the wind-driven generator may be shorted using the parallel shorting devices of the power converter when the fault-related parameter exceeds or falls below a predetermined threshold. For example, as indicated above, the shorting devices may be crowbar contactors. In such an embodiment, the contactors may be closed when the fault-related parameter exceeds or falls below the predetermined threshold, thereby preventing the flow of power to the rotor side converter.

It should be appreciated that the predetermined threshold may generally correspond to a parameter threshold at which the monitored parameter provides an indication of a fault-related condition of the system. For example, if the fault-related parameter being monitored is current or voltage, the predetermined threshold may correspond to a threshold current or voltage that is considered to be indicative of the fault-related condition.

It should also be appreciated that the present subject matter is also directed to a method for assembling a power generation system, such as the DFIG wind turbine system 200 described above with reference to FIG. 5. In general, the method may include coupling a power converter to a generator. The power converter may include a plurality of bridge circuits coupled in parallel and a plurality of parallel shorting devices coupled to the bridge circuits. Each bridge circuit may also be coupled to a rotor inductor. In addition, the method may include effectively coupling an impedance of the rotors inductors between the shorting devices and the generator such that a current is balanced between the parallel shorting devices when the power generation system is operating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power generation system, comprising:
a generator;
a power converter coupled to the generator, the power converter comprising a rotor side converter and a line side converter, the rotor side converter including a plurality of bridge circuits coupled in parallel, each bridge circuit being coupled to a rotor inductor, the power converter further comprising a plurality of parallel shorting devices,
wherein each snorting device is electrically coupled to bridge lines of the plurality of bridge circuits across two phases of an input to the rotor side converter such that an impedance of the rotor inductors is effectively coupled between the shorting devices and the generator.

2. The power generation system of claim 1, wherein the bridge circuits, rotor inductors and shorting devices form part of the rotor side converter.

3. The power generation system of claim 1, wherein each shorting device comprises a crowbar contactor.

4. The power generation system of claim 1, wherein the impedance of the rotor inductors balances a current supplied between the parallel shorting devices.

5. The power generation system of claim 1, wherein each bridge circuit is coupled in series with its corresponding rotor inductor.

6. The power generation system of claim 5, wherein each bridge circuit is coupled in series with a first rotor inductor and a second rotor inductor, the shorting devices being coupled between the first and second rotor inductors.

7. The power generation system of claim 1, wherein the impedance of each of the rotor inductors is substantially the same.

8. The power generation system of claim 1, further comprising a controller coupled to the shorting devices, the controller configured to activate and deactivate the shorting devices.

9. The power generation system of claim 1, wherein the generator is a doubly fed induction generator.

10. The power generation system of claim 9, wherein the power converter is coupled to a rotor of the doubly fed induction generator, the shorting devices being coupled to the bridge circuits such that the impedance of the rotor inductors is effectively coupled between the shorting devices and the rotor.

11. A power generation system, comprising:
a doubly fed induction generator including a stator and a rotor;
a power converter coupled to the doubly fed induction generator, the power converter including a rotor side converter and a line side converter, the rotor side converter comprising a plurality of bridge circuits coupled in parallel, each bridge circuit being coupled to a rotor inductor, the rotor side converter further comprising a plurality of shorting devices,
wherein each shorting device is electrically coupled to bridge lines of the plurality of bridge circuits across two phases of an input to the rotor side converter such that an impedance of the rotor inductors is effectively coupled between the shorting devices and the rotor of the doubly fed induction generator.

12. The power generation system of claim 11, wherein each shorting device comprises a crowbar contactor.

13. The power generation system of claim 11, wherein the impedance of the rotor inductors balances a current supplied between the parallel shorting devices.

14. The power generation system of claim 11, wherein each bridge circuit is coupled in series with its corresponding rotor inductor.

15. The power generation system of claim 14, wherein each bridge circuit is coupled in series with a first rotor inductor and a second rotor inductor, the shorting devices being coupled between the first and second rotor inductors.

16. The power generation system of claim 11, wherein the impedance of each of the rotor inductors is substantially the same.

17. The power generation system of claim 11, further comprising a controller coupled to the shorting devices, the controller configured to activate and deactivate the shorting devices.

18. A method for assembling a power generation system, the method comprising:

coupling a power converter to a generator, the power converter comprising a rotor side converter and a line side converter, the rotor side converter including a plurality of bridge circuits coupled in parallel and a plurality of parallel shorting devices coupled to the bridge circuits, each bridge circuit being coupled to a rotor inductor; and coupling each shorting device to bridge lines of the plurality of bridge circuits across two phases of an input to the rotor side converter such that an impedance of the rotor inductors is effectively coupled between the shorting devices and the generator.

19. The method of claim 18, wherein the bridge circuits, rotor inductors and shorting devices form part of the rotor side converter.

20. The method of claim 18, wherein each shorting device comprises a crowbar contactor.

\* \* \* \* \*